(12) United States Patent
Urabayashi et al.

(10) Patent No.: US 11,778,542 B2
(45) Date of Patent: Oct. 3, 2023

(54) MOBILE COMMUNICATION SYSTEM

(71) Applicant: KYOCERA Corporation, Kyoto (JP)

(72) Inventors: Hiroyuki Urabayashi, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/340,059

(22) PCT Filed: Oct. 6, 2017

(86) PCT No.: PCT/JP2017/036517
§ 371 (c)(1),
(2) Date: Apr. 5, 2019

(87) PCT Pub. No.: WO2018/070355
PCT Pub. Date: Apr. 19, 2018

(65) Prior Publication Data
US 2020/0059852 A1 Feb. 20, 2020

(30) Foreign Application Priority Data

Oct. 11, 2016 (JP) ................. 2016-199739

(51) Int. Cl.
*H04W 48/10* (2009.01)
*H04J 11/00* (2006.01)
*H04W 16/14* (2009.01)

(52) U.S. Cl.
CPC ......... *H04W 48/10* (2013.01); *H04J 11/0073* (2013.01); *H04J 11/0076* (2013.01); *H04J 11/0079* (2013.01); *H04W 16/14* (2013.01)

(58) Field of Classification Search
None
See application file for complete search history.

(56) References Cited

U.S. PATENT DOCUMENTS

2015/0049741 A1* 2/2015 Chen .................. H04W 16/14
370/336
2015/0055574 A1* 2/2015 Kim .................... H04J 11/0073
370/329

(Continued)

FOREIGN PATENT DOCUMENTS

WO WO-2017127181 A1 * 7/2017 ......... H04L 27/0006
WO 2018/014256 A1 1/2018

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-Utran); 3GPP TS 36.300 V13.4.0; Jun. 2016; pp. 1-310; Release 13; 3GPP Organizational Partners.

(Continued)

*Primary Examiner* — Rebecca E Song
(74) *Attorney, Agent, or Firm* — Studebaker & Brackett PC

(57) ABSTRACT

A mobile communication system according to one embodiment comprises: a base station configured to transmit discovery reference signal in an unlicensed spectrum, and a radio terminal configured to receive the discovery reference signal in the unlicensed spectrum. The base station notifies the radio terminal of timing information indicating a timing at which the discovery reference signal is to be transmitted in the unlicensed spectrum.

6 Claims, 11 Drawing Sheets

(56) References Cited

U.S. PATENT DOCUMENTS

| | | | |
|---|---|---|---|
| 2016/0105862 A1* | 4/2016 | Charbit | H04W 56/0015 370/336 |
| 2017/0238272 A1* | 8/2017 | You | H04L 5/001 370/350 |
| 2017/0238330 A1* | 8/2017 | Jiang | H04W 24/10 370/329 |
| 2017/0265082 A1* | 9/2017 | Jiang | H04W 72/042 |
| 2019/0238290 A1* | 8/2019 | Liu | H04W 68/005 |

OTHER PUBLICATIONS

Ericsson; Synchronization and acquisition of system information for FeMBMS; 3GPP TSG-RAN WG1 Meeting #86bis; R1-1609677; Oct. 10-14, 2016; total 6 pages; Lisbon, Portugal.

* cited by examiner

MOBILE COMMUNICATION SYSTEM

TECHNICAL FIELD

The present invention relates to a mobile communication system that performs communication using a specific frequency band.

BACKGROUND ART

In 3GPP (3rd Generation Partnership Project), a standardization project of mobile communication system, LAA (Licensed-Assisted Access) is introduced in release 13 specification. LAA is a technology that uses a licensed spectrum as a primary cell (PCell) and at least one secondary cell (SCell) operating in a specific frequency band in carrier aggregation. Such a specific frequency band is called as unlicensed spectrum (unlicensed frequency band).

In Release 13, LAA SCell is limited to downlink. A base station performs LBT (Listen-Before-Talk) before performing downlink transmission on the LAA SCell. Specifically, the base station monitors/senses a channel on the LAA SCell to determine whether the channel is free or busy. The base station performs downlink transmission when it is determined that the channel is empty, otherwise the base station does not perform downlink transmission.

On the other hand, a standalone operation in which LTE (Long Term Evolution) communication uses only the unlicensed spectrum without using the licensed spectrum is also being considered. Hereinafter, such an operation is referred to as a standalone LTE-U. In the LAA, on the assumption that there is assistance from the licensed spectrum, the radio terminal is able to use the unlicensed spectrum; but in the standalone LTE-U, it is not possible to use the assistance by the licensed spectrum. Therefore, in the standalone LTE-U, it is desirable to realize a technology enabling appropriate communication between a base station and a radio terminal.

PRIOR ART DOCUMENT

Non-Patent Document

Non-Patent Document 1: 3GPP technical specification "TS 36.300 V 13.4.0"

SUMMARY

A mobile communication system according to one embodiment comprises: a base station configured to transmit discovery reference signal in an unlicensed spectrum, and a radio terminal configured to receive the discovery reference signal in the unlicensed spectrum. The base station notifies the radio terminal of timing information indicating a timing at which the discovery reference signal is to be transmitted in the unlicensed spectrum.

A mobile communication system according to one embodiment comprises: a base station configured to transmit a discovery reference signal and a broadcast signal at a predetermined cycle in an unlicensed spectrum, and a radio terminal configured to receive the discovery reference signal and the broadcast signal in the unlicensed spectrum. The base station transmits the broadcast signal in a subframe used for transmitting the discovery reference signal, using a region in which the discovery reference signal is not arranged.

A mobile communication system according to one embodiment comprises: a base station configured to attempt to transmit a predetermined signal at a predetermined timing in an unlicensed spectrum, and a radio terminal configured to attempt to receive the predetermined signal at the predetermined timing in the unlicensed spectrum. The base station attempts to transmit the predetermined signal at a changed timing by changing the predetermined timing, in response to transmission of the predetermined signal being disabled at the predetermined timing. The radio terminal attempts to receive the predetermined signal at the changed timing in response to not receiving radio signal from the base station at the predetermined timing.

DESCRIPTION OF EMBODIMENTS

Mobile Communication System

Figure 1:
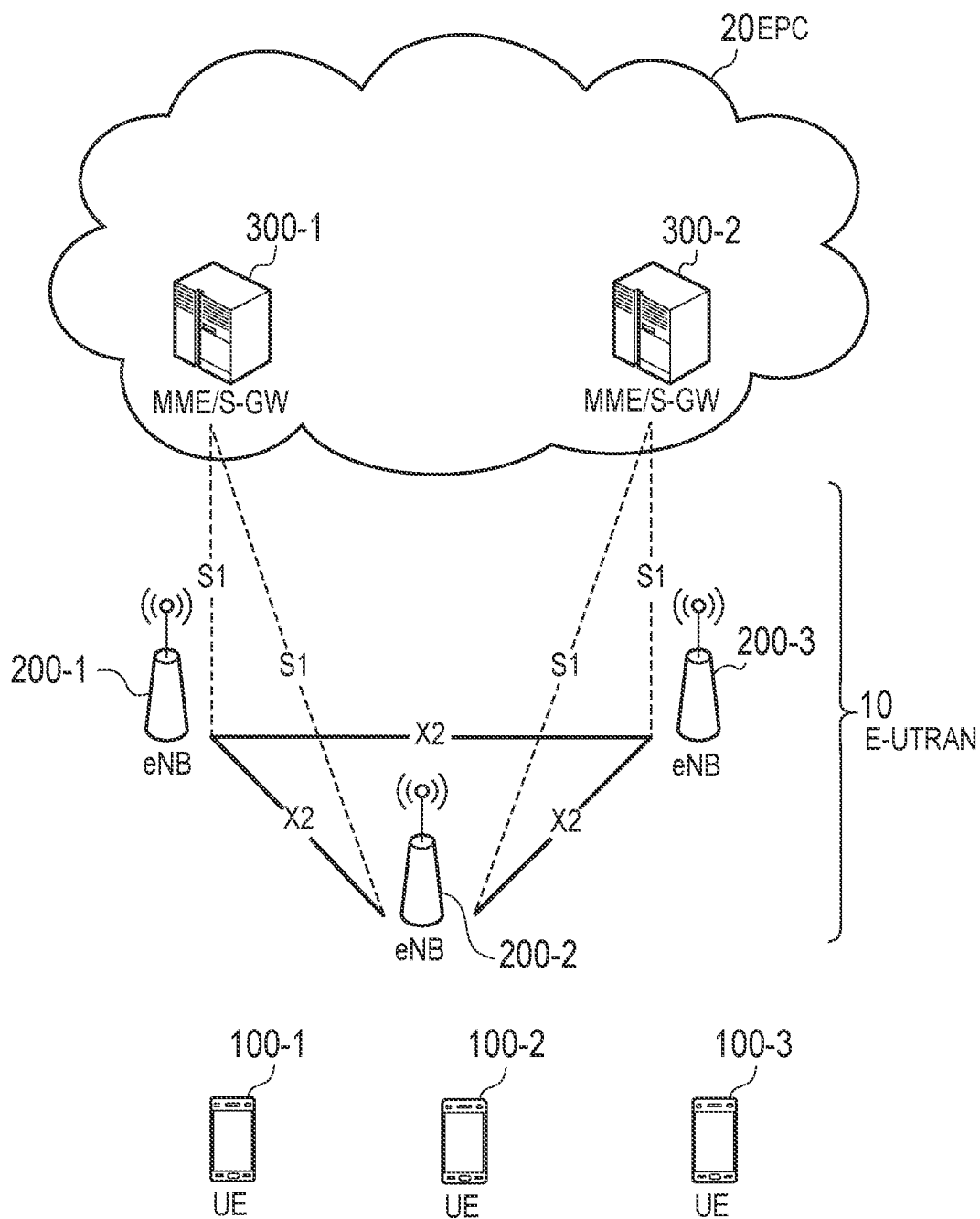
FIG. 1 is a diagram illustrating a configuration of an LTE system according to embodiments.

Hereinafter, the configuration of the mobile communication system according to the embodiment will be described. FIG. 1 is a diagram illustrating a configuration of an LTE (Long Term Evolution) system which is a mobile communication system according to the embodiment. The LTE system is a mobile communication system based on the 3GPP standard.

As illustrated in FIG. 1, the LTE system includes a UE (User Equipment) 100, an E-UTRAN (Evolved-UMTS Terrestrial Radio Access Network) 10, and an EPC (Evolved Packet Core) 20.

The UE 100 corresponds to a radio terminal. The UE 100 is a mobile communication device. The UE 100 performs radio communication with a cell (serving cell).

The E-UTRAN 10 corresponds to a radio access network. The E-UTRAN 10 includes an eNB 200 (evolved Node-B).

The eNB 200 corresponds to a base station. eNBs 200 are connected to each other via X2 interfaces.

The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter referred to simply as "data"), a measurement control function for mobility control/scheduling, and the like. "Cell" is used as a term indicating the minimum unit of radio communication area. "Cell" is also used as a term indicating a function for performing radio communication with the UE 100.

The EPC 20 corresponds to a core network. The EPC 20 includes an MME (Mobility Management Entity)/S-GW (Serving-Gateway) 300. The MME performs various mobility control and the like for the UE 100. The S-GW performs data transfer control. The MME/S-GW 300 is connected to the eNB 200 via an S1 interface.

Figure 2:
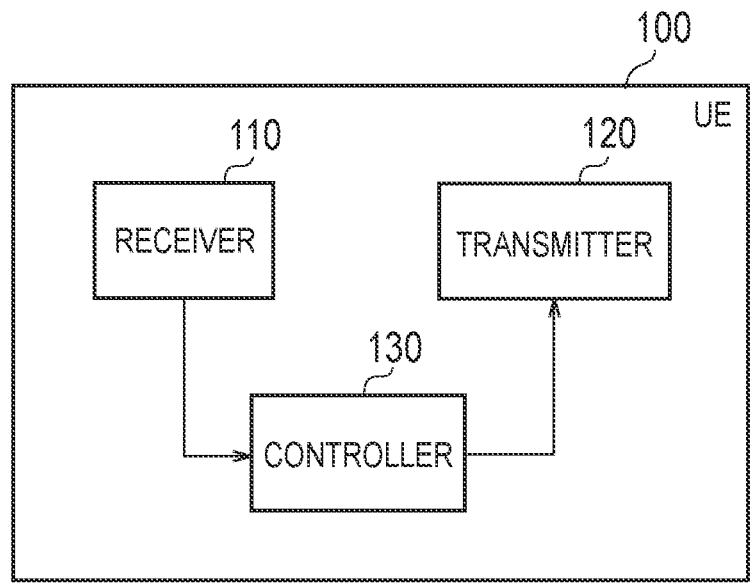
FIG. 2 is a diagram illustrating a configuration of a UE (radio terminal) according to the embodiments.

FIG. 2 is a diagram illustrating a configuration of a UE (radio terminal). As illustrated in FIG. 2, the UE 100 includes a receiver 110, a transmitter 120, and a controller 130.

The receiver 110 performs various types of reception under control of the controller 130. The receiver 110 includes antennas and a receiving machine. The receiving machine converts the radio signal received by the antennas into a baseband signal (reception signal). The receiving machine outputs the baseband signal to the controller 130.

The transmitter 120 performs various transmissions under control of the controller 130. The transmitter 120 includes antennas and a transmitting machine. The transmitting machine converts a baseband signal (transmission signal) output from the controller 130 into a radio signal and transmits it from the antennas.

The controller 130 performs various controls in the UE 100. The controller 130 includes at least one processor and memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor executes processes to be described later.

Figure 3:
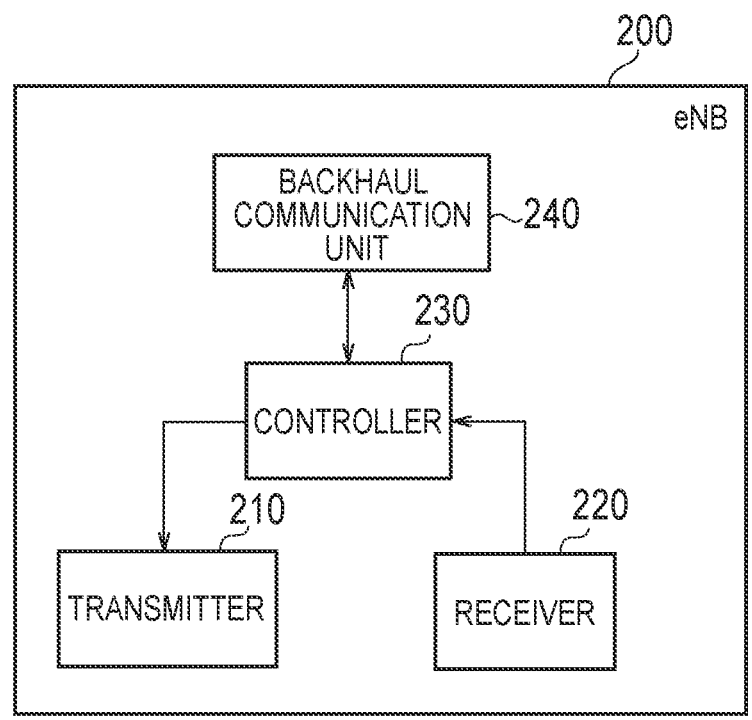
FIG. 3 is a diagram illustrating a configuration of an eNB (base station) according to the embodiments.

FIG. 3 is a diagram illustrating a configuration of an eNB (base station). As illustrated in FIG. 3, the eNB 200 includes a transmitter 210, a receiver 220, a controller 230, and a backhaul communication unit 240.

The transmitter 210 performs various transmissions under control of the controller 230. The transmitter 210 includes antennas and a transmitting machine. The transmitting machine converts a baseband signal (transmission signal) outputted by the controller 230 into a radio signal. The transmitting machine transmits the radio signal from the antennas.

The receiver 220 performs various types of reception under control of the controller 230. The receiver 220 includes antennas and a receiving machine. The receiving machine converts the radio signal received by the antennas into a baseband signal (received signal). The receiving machine outputs the baseband signal to the controller 230.

The controller 230 performs various controls in the eNB 200. The controller 230 includes at least one processor and memory. The memory stores programs executed by the processor and information used for processing by the processor. The processor includes a baseband processor and a CPU. The baseband processor performs modulation and demodulation, encoding, decoding, and the like of the baseband signal. The CPU executes various processes by executing programs stored in the memory. The processor executes processes to be described later.

The backhaul communication unit 240 is connected to the adjacent eNB 200 via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
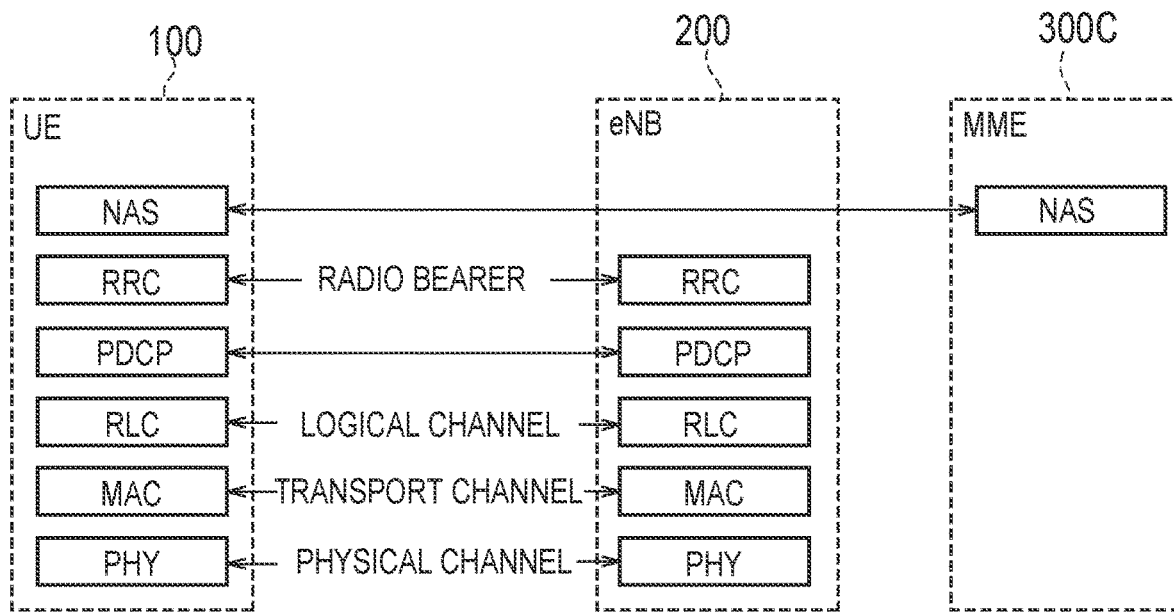
FIG. 4 is a diagram illustrating a configuration of a protocol stack of a radio interface according to the embodiments.

FIG. 4 is a diagram illustrating a configuration of a protocol stack of a radio interface. As illustrated in FIG. 4, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The PHY layer carries out coding/decoding, modulation/demodulation, antenna mapping/demapping, resource mapping/demapping. Between the PHY layer of the UE 100 and the PHY layer of the eNB 200, data and control information are transmitted via the physical channel.

The MAC layer performs priority control of data, retransmission processing by hybrid ARQ (HARQ), random access procedure, and the like. Between the MAC layer of the UE 100 and the MAC layer of the eNB 200, data and control information are transmitted via a transport channel. The MAC layer of the eNB 200 includes a scheduler. The scheduler determines the uplink and downlink transport format (transport block size, modulation and coding scheme (MCS)) and the allocated resource block to the UE 100.

The RLC layer uses the functions of the MAC layer and the PHY layer to transmit data to the RLC layer on the receiving side. Between the RLC layer of the UE 100 and the RLC layer of the eNB 200, data and control information are transmitted via logical channels.

The PDCP layer carries out header compression/decompression, encryption/decryption.

The RRC layer is defined only in the control plane handling the control information. Between the RRC layer of the UE 100 and the RRC layer of the eNB 200, messages (RRC signaling) for various settings is transmitted. The RRC layer controls logical channels, transport channels, and physical channels in response to establishment, reestablishment and release of radio bearers. If there is a connection (RRC connection) between the RRC of the UE 100 and the RRC of the eNB 200, the UE 100 is in the RRC connected mode. If there is not a connection (RRC connection) between the RRC of the UE 100 and the RRC of the eNB 200, the UE 100 is in the RRC idle mode.

Figure 5:
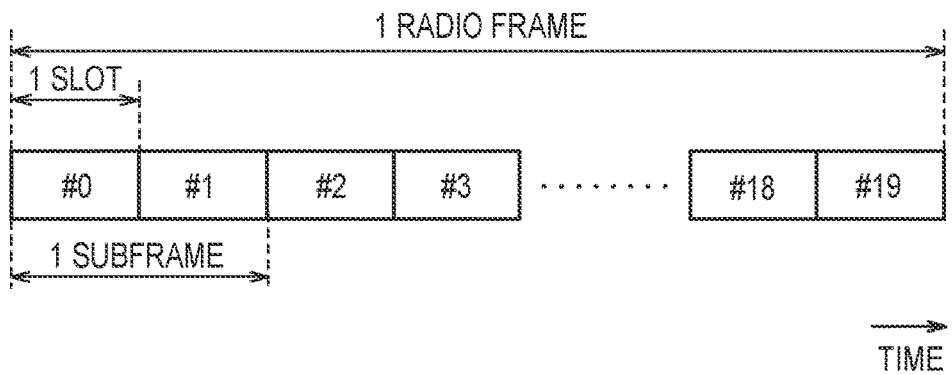
FIG. 5 is a diagram illustrating a configuration of a radio frame according to the embodiments.

A NAS (Non-Access Stratum) layer located above the RRC layer performs session management, mobility management, and the like. N FIG. 5 is a diagram illustrating a configuration of a radio frame used in the LTE system. In the LTE system, OFDMA (Orthogonal Frequency Division Multiple Access) is applied to the downlink and SC-FDMA (Single Carrier Frequency Division Multiple Access) is applied to the uplink.

As illustrated in FIG. 5, the radio frame is composed of ten subframes on the time axis. Each subframe is composed of two slots on the time axis. The length of each subframe is 1 ms. The length of each slot is 0.5 ms. Each subframe includes a plurality of resource blocks (RB) on the frequency axis. Each subframe includes a plurality of symbols on the time axis and includes a plurality of subcarriers on the frequency axis. Specifically, one RB is composed of twelve subcarriers and one slot. One symbol and one subcarrier constitute one resource element (RE). Among radio resources (time/frequency resources) allocated to the UE 100, frequency resources can be specified by resource blocks and time resources can be specified by subframes (or slots).

In the downlink, the section of the first several symbols of each subframe is a region used mainly as a physical downlink control channel (PDCCH) for transmitting downlink control information. The remaining part of each subframe is a region that can be mainly used as a physical downlink shared channel (PDSCH) for transmitting downlink data. In the uplink, both end portions in the frequency direction in each subframe are mainly used as a physical uplink control channel (PUCCH) for transmitting uplink control information. The remaining part of each subframe is a region that can be mainly used as a physical uplink shared channel (PUSCH) for transmitting uplink data.

Stand-Alone LTE-U

Hereinafter, a stand-alone LTE-U according to the embodiments will be described. The standalone LTE-U performs LTE communication only in the unlicensed spectrum without the use of licensed spectrum.

Figure 6:
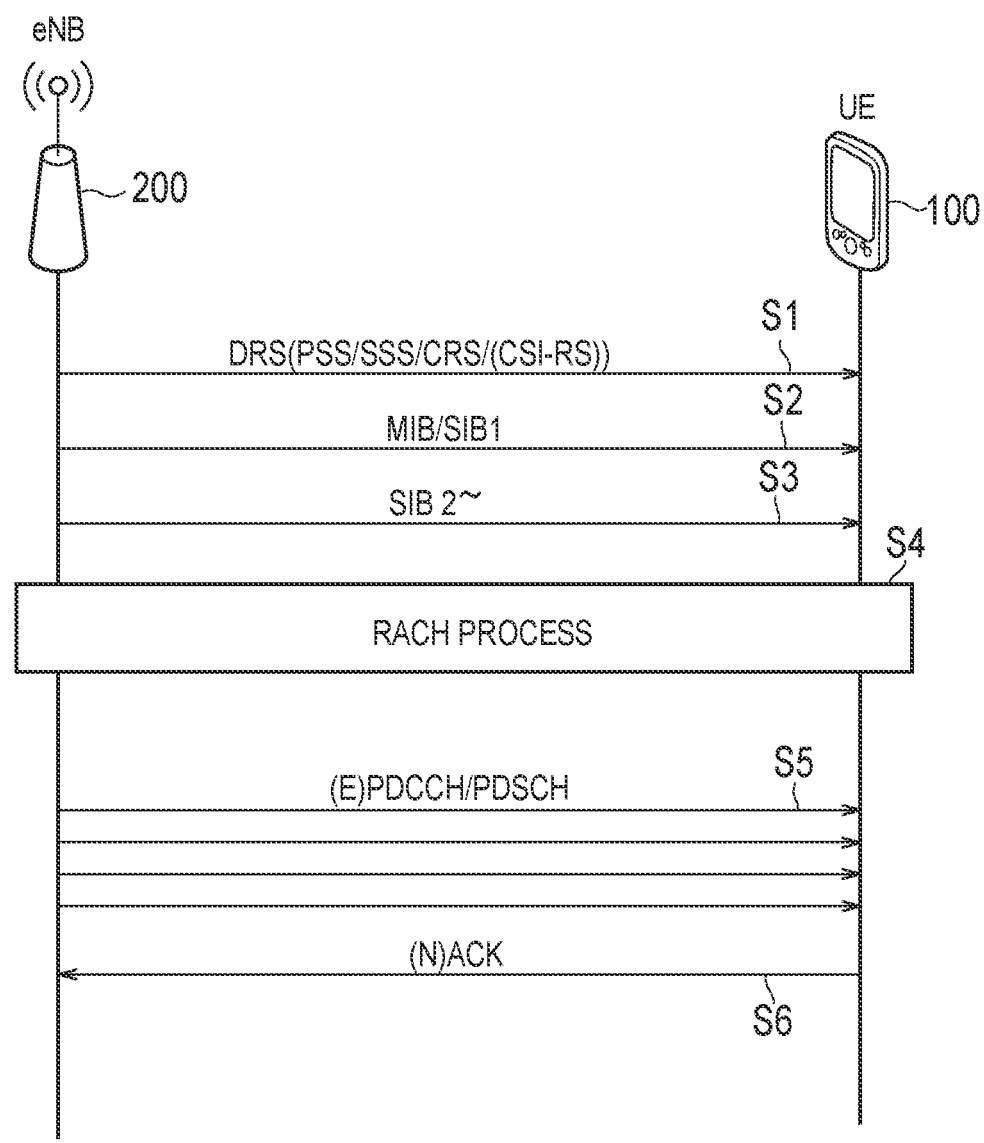
FIG. 6 is a diagram illustrating an example of a basic operation of the standalone LTE-U according to the embodiments.

FIG. 6 is a diagram illustrating an example of a basic operation of the standalone LTE-U. The steps illustrated in FIG. 6 are performed in the unlicensed spectrum.

As illustrated in FIG. 6, in step S1, the eNB 200 transmits a discovery reference signal (DRS) used by the UE 100 to discover a cell of the eNB 200. The DRS is a periodically transmitted signal. The DRS includes a primary synchronization signal PSS), a secondary synchronization signal (SSS), and a cell-specific reference signal (CRS). The DRS may include a channel state information reference signal (CSI-RS).

The PSS and SSS are synchronization signals used by the UE 100 for cell search. The PSS and SSS are transmitted in the center 945 kHz of the system bandwidth (i.e., 6 resource blocks).

The UE 100 performs a first stage of cell search. In the first stage of the cell search, the UE 100 detects the PSS and performs carrier frequency detection, symbol timing synchronization, and local ID detection based on a sequence (signal sequence) of the PSS. The local ID corresponds to cell IDs (for example, 3 pieces) in a cell ID group (e.g., 168 pieces). Next, the UE 100 performs a second stage of the cell search. In the second stage of the cell search, the UE 100 detects the SSS and performs radio frame synchronization and cell ID group detection based on an SSS sequence. The UE 100 acquires a cell ID (PCI: Physical Cell ID) based on the local ID and the cell ID group. The UE 100 detects the CRS corresponding to the PCI based on the acquired PCI. The CRS is used for measurement of downlink reception quality and the like.

In step S2, the eNB 200 transmits a master information block (MIB) and a system information block type 1 (SIB 1). The MIB is transmitted by a physical broadcast channel (PBCH) located at the center portion of the system bandwidth as well as the synchronization signal. The MIB is the minimum information to be acquired by the UE 100 after the cell search, for example, system frame number (SFN), number of transmitting antennas, and the like. SIB 1 includes scheduling information of each SIB other than SIB 1.

In step S3, the eNB 200 transmits other SIBs (e.g., SIB 2 to SIB 20) in accordance with the scheduling information in the SIB 1.

In step S4, the UE 100 and the eNB 200 perform a random access procedure (RACH process) for establishing a connection (RRC connection).

In step S5, the eNB 200 performs downlink transmission to the UE 100. The eNB 200 transmits downlink control information (DCI) to the UE 100 by a PDCCH (or a EPDCCH), and transmits downlink data to the UE 100 by a PDSCH.

In step S6, the UE 100 transmits an ACK/NACK indicating whether or not the decoding of the downlink data has succeeded to the eNB 200.

Since the unlicensed spectrum is a frequency band shared by multiple communication systems and/or multiple operators, LTB is required. The eNB 200 monitors/senses channels in the unlicensed spectrum to determine whether the channel is free or busy. If the eNB 200 determines that a channel is empty (i.e., successful LBT), the eNB 200 performs transmission, otherwise, the eNB does not perform transmission. If LBT is successful, it is allowed to occupy the channel for a predetermined period of time.

First Embodiment

Hereinafter, a first embodiment will be described.

For general LTE communication (i.e., LTE communication in licensed spectrum), a transmission timing of the DRS is limited to particular subframes in a radio frame (e.g., subframe numbers #0 and #5). On the other hand, in the case of LAA, a transmission timing of the DRS is configured to the UE 100 by dedicated RRC signaling from a PCell of the licensed spectrum. The transmission timing of the DRS can be freely configured within the range of subframe numbers #0 to #9. The UE 100 attempts to receive and measure DRS at a timing configured from the eNB 200.

However, in the case of stand-alone LTE-U, since there is no PCell of licensed spectrum, it is not possible to use the same DRS transmission timing notification method as that of the LAA.

In the first embodiment, the eNB 200 transmits the DRS in the unlicensed spectrum (specific frequency band). The eNB 200 notifies the UE 100 of timing information indicating the timing at which the DRS is to be transmitted in the unlicensed spectrum. In other words, the eNB 200 notifies the UE 100 of the transmission timing of the DRS from the cell of the unlicensed spectrum. This makes it possible to notify the UE 100 of the DRS transmission timing even in the case of the standalone LTE-U, that is, the PCell of the licensed spectrum does not exist.

In the first embodiment, the timing information includes a subframe number. The timing information may include a system frame number (SFN) and/or a slot number. An example in which the timing information is a subframe number will be described below. The subframe in which the DRS is to be transmitted is referred to as a DRS subframe, and the number of the subframe is referred to as a "DRS subframe number". The DRS subframe may be defined as monitoring subframes where UE 100 is to attempt to receive DRS.

In the first embodiment, the eNB 200 transmits DRS in a transmission manner in which the DRS subframe number being able to be identified by the UE 100. Upon receiving the DRS, the UE 100 identifies the DRS subframe number based on the transmission manner of the DRS. Thus, the DRS itself can be used to notify the UE 100 of the DRS subframe number. The DRS subframe number is determined by the eNB 200 within subframe numbers #0 to #9.

In an operation pattern 1 of the first embodiment, the DRS includes a synchronization signal (PSS, SSS) mapped to a cell ID (PCI) of a cell managed by the eNB 200. The cell ID is mapped to the DRS subframe number. The UE 100 specifies the cell ID based on the synchronization signal, and specifies the DRS subframe number based on the identified cell ID.

Figure 7:
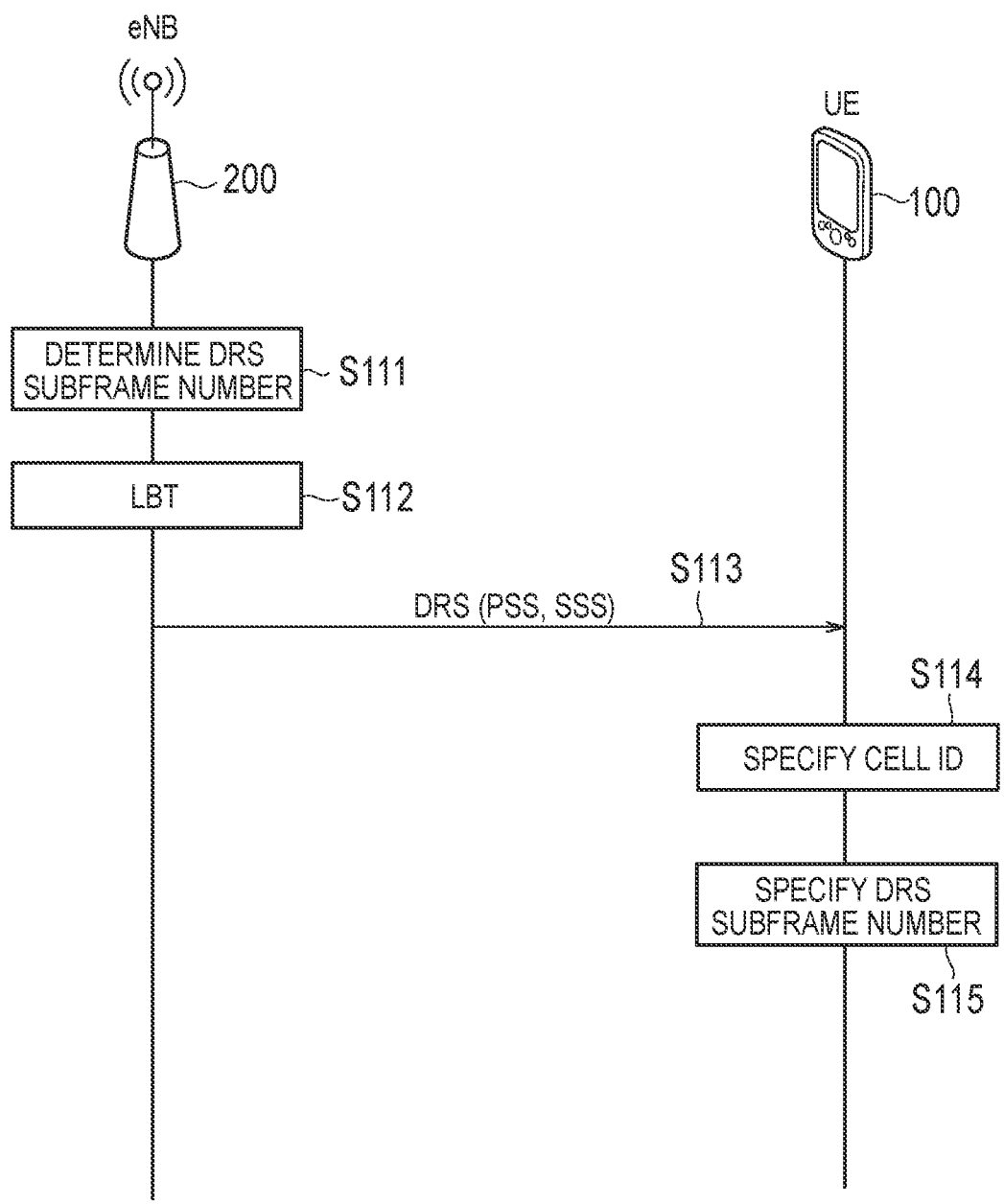
FIG. 7 is a diagram illustrating an example of an operation pattern 1 of a first embodiment.

FIG. 7 is a diagram illustrating an example of the operation pattern 1 of the first embodiment. As illustrated in FIG. 7, in step S111, the eNB 200 determines the DRS subframe number corresponding to the cell ID of a cell of the eNB 200 using a predetermined rule. The predetermined rule is predefined by system specifications. The predetermined rule may be defined by a table in which a cell ID and a DRS subframe number are mapped to each other, or may be defined by a calculation formula (e.g., mod calculation) using a cell ID. In step S112, the eNB 200 performs LBT for transmitting the DRS. Here, description will be made assuming that LBT is successful. In step S113, the eNB 200 transmits the DRS (PSS and SSS). Each sequence of PSS and SSS is mapped to the cell ID of the cell of eNB 200. The UE 100 receives PSS and SSS by cell search. In step S114, the UE 100 specifies the cell ID based on each sequence of the PSS and the SSS. In step S115, the UE 100 specifies the DRS subframe number corresponding to the cell ID by using a predetermined rule that is predefined. The UE 100 then attempts to receive the DRS in the subframe of the identified subframe number.

In an operation pattern 2 of the first embodiment, the DRS includes a synchronization signal (SSS) mapped to a cell ID group of a cell of the eNB 200. The cell ID group is mapped to the DRS subframe number. The UE 100 identifies the cell ID group based on the synchronization signal (SSS) and identifies the DRS subframe number based on the identified cell ID group. As an example, some of the 168 cell ID groups are reserved as special cell ID groups for specifying DRS subframe number. In the case of the operation pattern 2, the number of available cell IDs decreases. The mapping relation between the special cell ID group and the DRS subframe number is predefined by the system specification.

Figure 8:
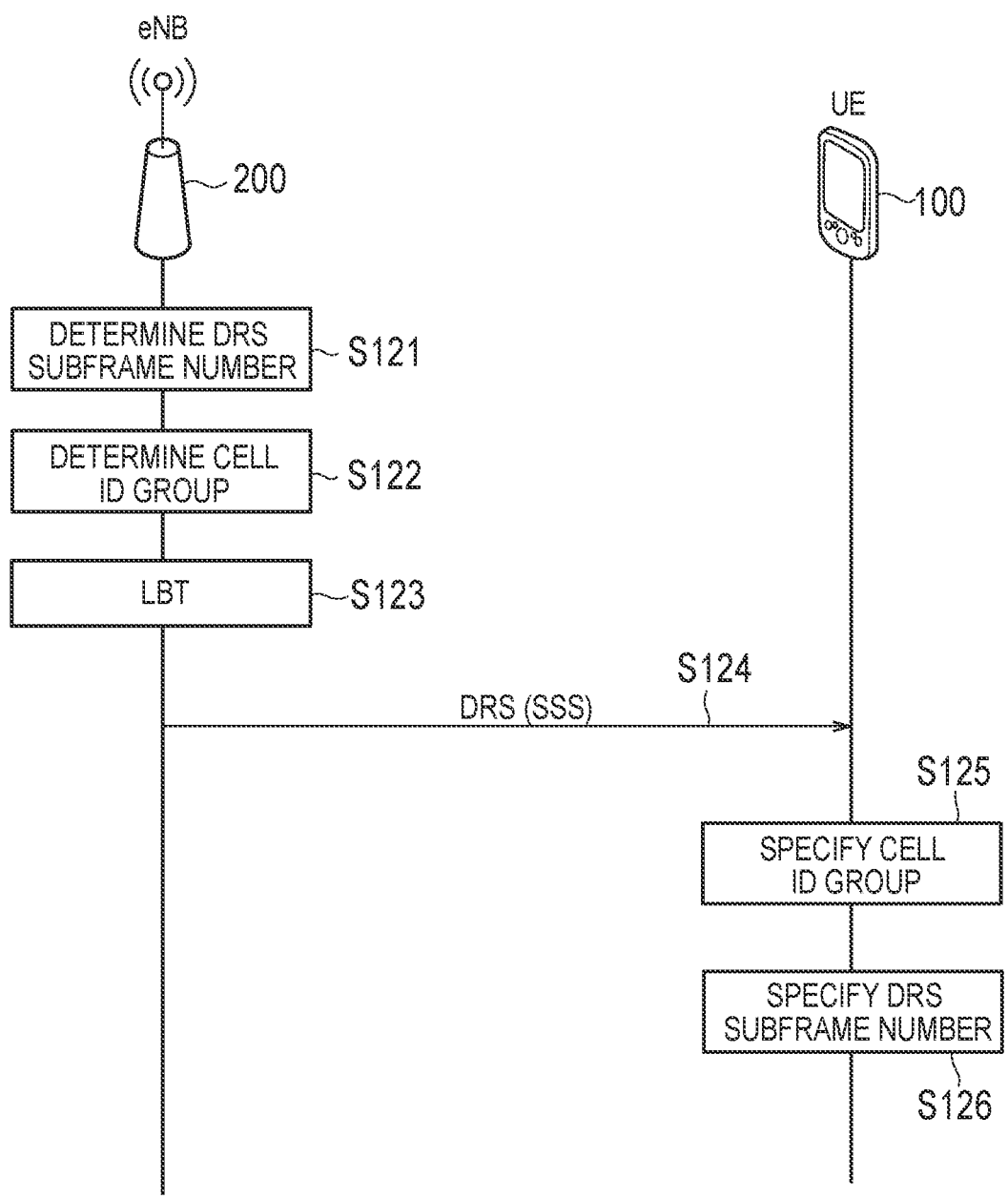
FIG. 8 is a diagram illustrating an example of an operation pattern 2 of the first embodiment.

FIG. 8 is a diagram illustrating an example of the operation pattern 2 of the first embodiment. As illustrated in FIG. 8, in step S121, the eNB 200 determines DRS subframe number. In step S122, the eNB 200 uses the predefined mapping relation to determine a special cell ID group (i.e., a sequence of SSS) corresponding to the DRS subframe number. In step S123, the eNB 200 performs LBT for transmitting the DRS. Here, description will be made assuming that LBT is successful. In step S124, the eNB 200 transmits DRS (SSS). The sequence of SSS is mapped to a special cell ID group. The UE 100 receives the SSS by cell search. In step S125, the UE 100 specifies the cell ID group based on the sequence of the SSS. The UE 100 determines that the specified cell ID group is a special cell ID group, and specifies the DRS subframe number mapped to the cell ID group using the predefined mapping relation. The UE 100 then attempts to receive the DRS in the subframe of the identified subframe number.

Although DRS subframe numbers are mapped to the SSS sequence (cell ID group) in the operation pattern 2 of the first embodiment, the DRS subframe number may be mapped to the sequence of the PSS (the local ID that is the cell ID in the cell ID group). In this case, in the operation pattern 2 of the first embodiment, "SSS" is read as "PSS", and the "cell ID group" is read as the "cell ID (local ID) in the cell ID group". In such a modification, each of the three local IDs is mapped to one or more DRS subframe numbers. Alternatively, by extending the local ID (PSS sequence) to 10, one local ID (PSS sequence) may be mapped to one DRS subframe number. That is, a series of 10 patterns is prepared in advance as the PSS. In this case, a larger number of cell IDs may be defined than the current cell ID range (504). The eNB 200 determines the DRS subframe number from the local ID corresponding to the cell ID of its own cell. Next, the eNB 200 transmits DRS (PSS and SSS). The PSS sequence (local ID) is mapped to the DRS subframe number. The UE 100 receives PSS and SSS by cell search. The UE 100 identifies the local ID based on the PSS sequence, and identifies the DRS subframe number based on the local ID. The UE 100 identifies a cell ID based on each sequence of PSS and SSS. The UE 100 then attempts to receive the DRS in the subframe of the identified subframe number.

In an operation pattern 3 of the first embodiment, the DRS includes a synchronization signal (PSS and/or SSS) having a sequence mapped to the DRS subframe number. The UE 100 identifies the DRS subframe number based on the received sequence of synchronization signal. Generally, the SSS sequences are assigned with different sequences between the case of being transmitted within subframe number #0 and the case of being transmitted within subframe number #1. In the operation pattern 3, in order to enable the SSS to be transmitted even in subframes other than subframe numbers #0 and #5, the number of sequences indicating the subframes is increased compared to the conventional one.

Figure 9:
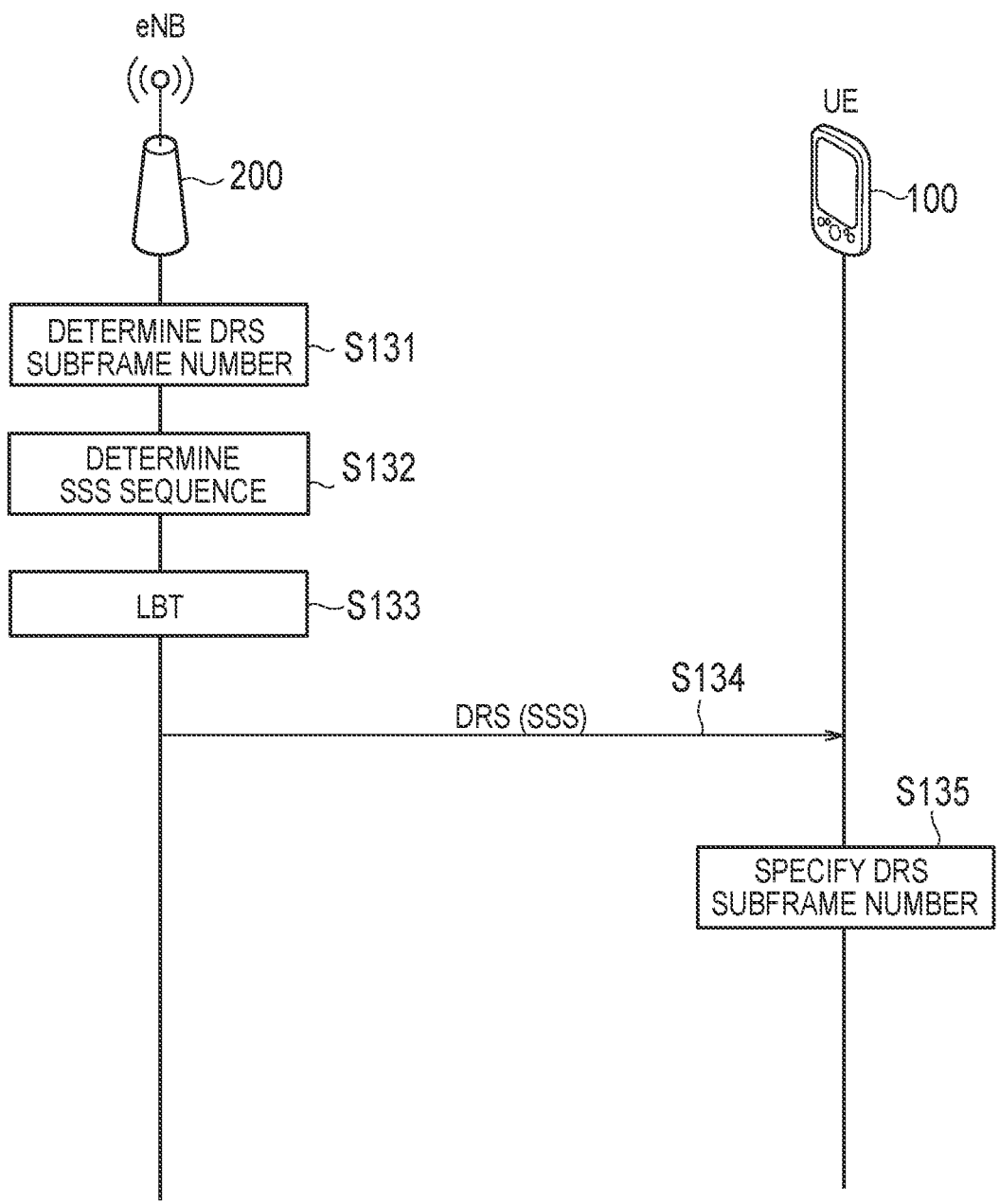
FIG. 9 is a diagram illustrating an example of an operation pattern 3 of the first embodiment.

FIG. 9 is a diagram illustrating an example of the operation pattern 3 of the first embodiment. As illustrated in FIG. 9, in step S131, the eNB 200 determines DRS subframe number. In step S132, the eNB 200 uses the predefined mapping relation to determine the SSS sequence corresponding to the DRS subframe number. In step S133, the eNB 200 performs LBT for transmitting the DRS. Here, description will be made assuming that LBT is successful. In operation pattern 3, steps S131 and S132 may be performed after LBT. That is, the number of the subframe immediately after successful LBT may be determined as the DRS subframe number. In step S134, the eNB 200 transmits DRS (PSS and SSS) in the subframe corresponding to the DRS subframe number. The sequence of the SSS is mapped to the DRS subframe number. The UE 100 receives PSS and SSS by cell search. The candidate of the cell ID is narrowed down to 168 patterns by receiving the PSS. The UE 100 attempts to decode the PSS for each of the candidate timing (here, 10) of the SSS transmission. As an example, the UE 100 attempts to decode 168×10=1680 SSS sequences using all combinations, and identifies the subframe in which the SSS was transmitted based on the decoded SSS sequence (step S135).

In an operation pattern 4 of the first embodiment, the DRS includes a cell-specific reference signal (CRS) having a sequence mapped to a DRS subframe number. As an example, the eNB 200 uses the DRS subframe number as a parameter for generating the CRS sequence. The UE 100 identifies DRS subframe numbers based on the CRS sequence. In the operation pattern 4, the CRS is configured by combining a sequence corresponding to the cell ID and a sequence corresponding to the DRS subframe number. That is, the DRS subframe number is used as one of the parameters for generating the CRS sequence.

Figure 10:
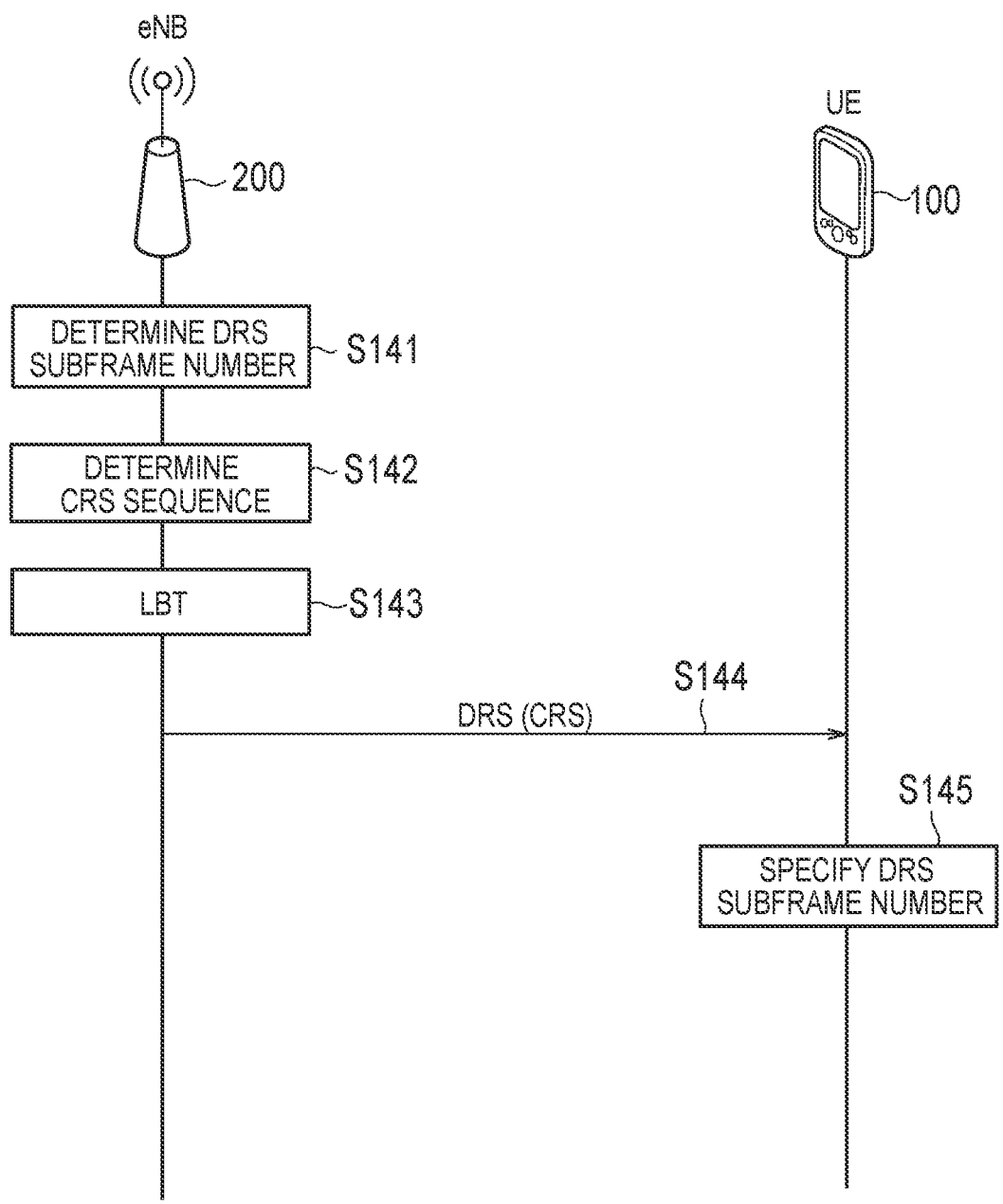
FIG. 10 is a diagram illustrating an example of an operation pattern 4 of the first embodiment.

FIG. 10 is a diagram illustrating an example of the operation pattern 4 of the first embodiment. As illustrated in FIG. 10, in step S141, the eNB 200 determines DRS subframe number. In step S142, the eNB 200 uses the predefined mapping relation to determine a special CRS sequence corresponding to the DRS subframe number. In step S143, the eNB 200 performs LBT for transmitting the DRS. Here, description will be made assuming that LBT is successful. In step S144, the eNB 200 transmits DRS (CRS). The CRS sequence is mapped to the DRS subframe number. The UE 100 receives the CRS through a cell search. In step S144, the UE 100 determines that the CRS sequence is a special CRS sequence, and uses the predefined mapping relation to identify the DRS subframe number corresponding to the CRS sequence. The UE 100 then attempts to receive the DRS in the subframe of the identified subframe number.

Modification of the First Embodiment

In the first embodiment described above, an example in which the DRS is transmitted in a transmission manner in which the DRS subframe number being able to be identified the UE 100 has been described. In other words, the DRS subframe number is notified to the UE 100 by using the DRS. However, the DRS subframe number may be notified to the UE 100 using a signal different from the DRS.

In the modification of the first embodiment, the eNB 200 further transmits a broadcast signal different from the DRS in the unlicensed spectrum. The broadcast signal is a MIB or a SIB. The broadcast signal is mapped to the DRS subframe number. As an example, the DRS subframe number may be included in the broadcast signal, or a new format of the broadcast signal mapped to the DRS subframe number may be defined. The eNB 200 transmits a broadcast signal (MIB or SIB) in the same subframe as the DRS, which will be described in detail later. The UE 100 may further receive the broadcast signal (MIB or SIB) in the unlicensed spectrum. The UE 100 identifies DRS subframe numbers based on the broadcast signal.

Figure 11:
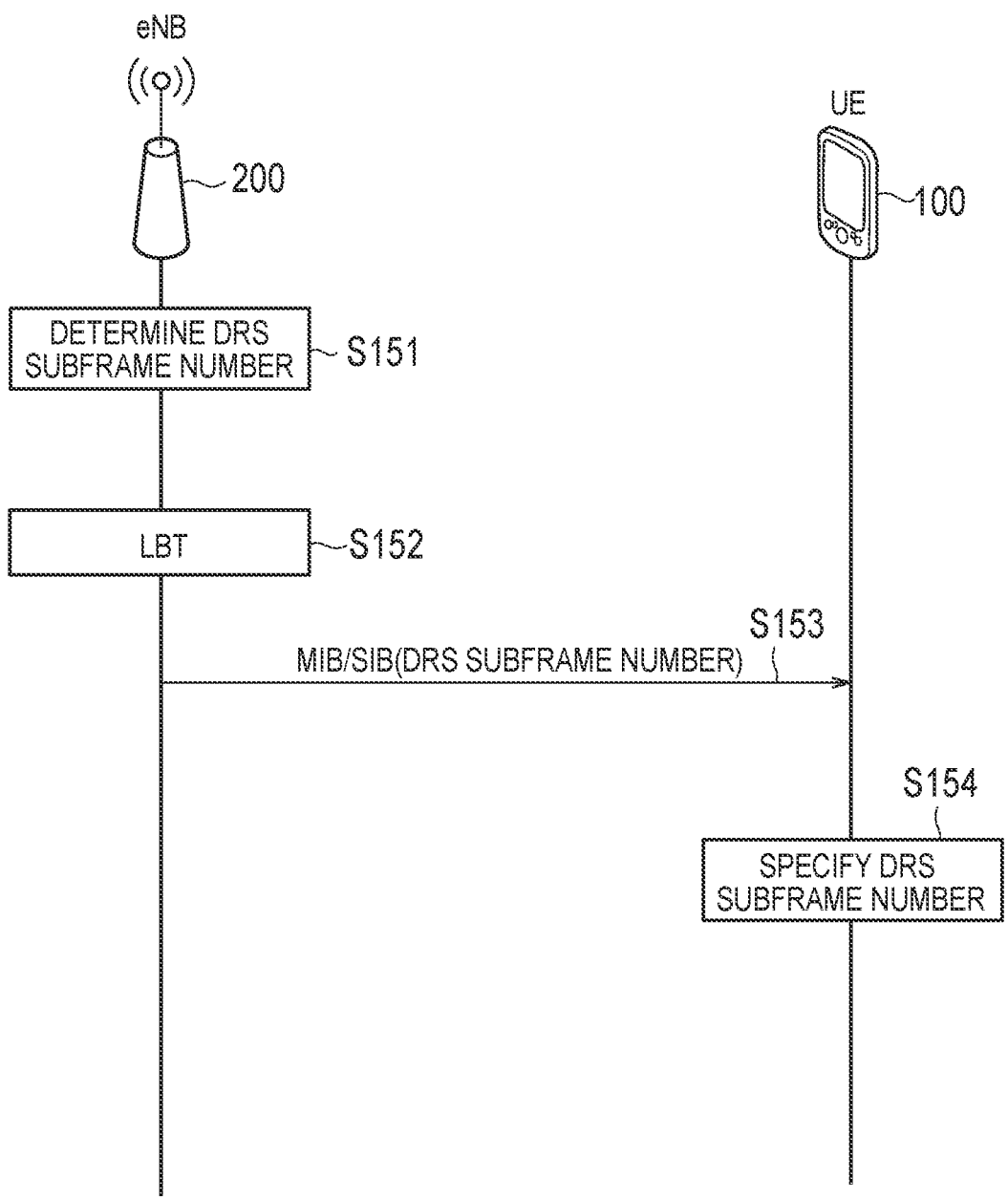
FIG. 11 is a diagram illustrating a modification of the first embodiment.

FIG. 11 is a diagram illustrating the modification of the first embodiment. As shown in FIG. 11, in step S151, the eNB 200 determines DRS subframe number. In step S152, the eNB 200 performs LBT for transmitting a broadcast signal (MIB or SIB). Here, description will be made assuming that LBT is successful. In step S153, the eNB 200 transmits a broadcast signal (MIB or SIB) including the DRS subframe number. After cell search, the UE 100 receives the broadcast signal (MIB or SIB). Specifically, the UE 100 acquires a cell ID by the PSS and SSS reception, and decodes the MIB/SIB transmitted in the subframe in which the PSS and SSS are received based on the cell ID. In step S154, the UE 100 specifies the DRS subframe number included in the received broadcast signal. The UE 100 then attempts to receive the DRS in the subframe of the identified subframe number.

Second Embodiment

In the following, differences from the first embodiment will be mainly described with respect to the second embodiment.

Each of the DRS, the MIB, and the SIB is a periodic signal. However, in the case of transmitting such periodic signals in the unlicensed spectrum, a channel occupancy period after the success of LBT is consumed due to the periodic signals, and there is a concern that the time that the downlink data can be transmitted may be compressed. The transmission of periodic signals may cause interference to other devices that utilize the unlicensed spectrum.

In the second embodiment, the eNB 200 transmits DRS and the broadcast signal (MIB and/or SIB) in a predetermined cycle in the unlicensed spectrum. The eNB 200 transmits a broadcast signal in a subframe used for transmitting the DRS by using a region in which no DRS is arranged. The UE 100 receives the DRS and the broadcast signal. In this way, by enabling the DRS and the broadcast signal to be transmitted in the same subframe, it is possible to shorten the time required for transmitting the DRS and the broadcast signal.

Figure 12:
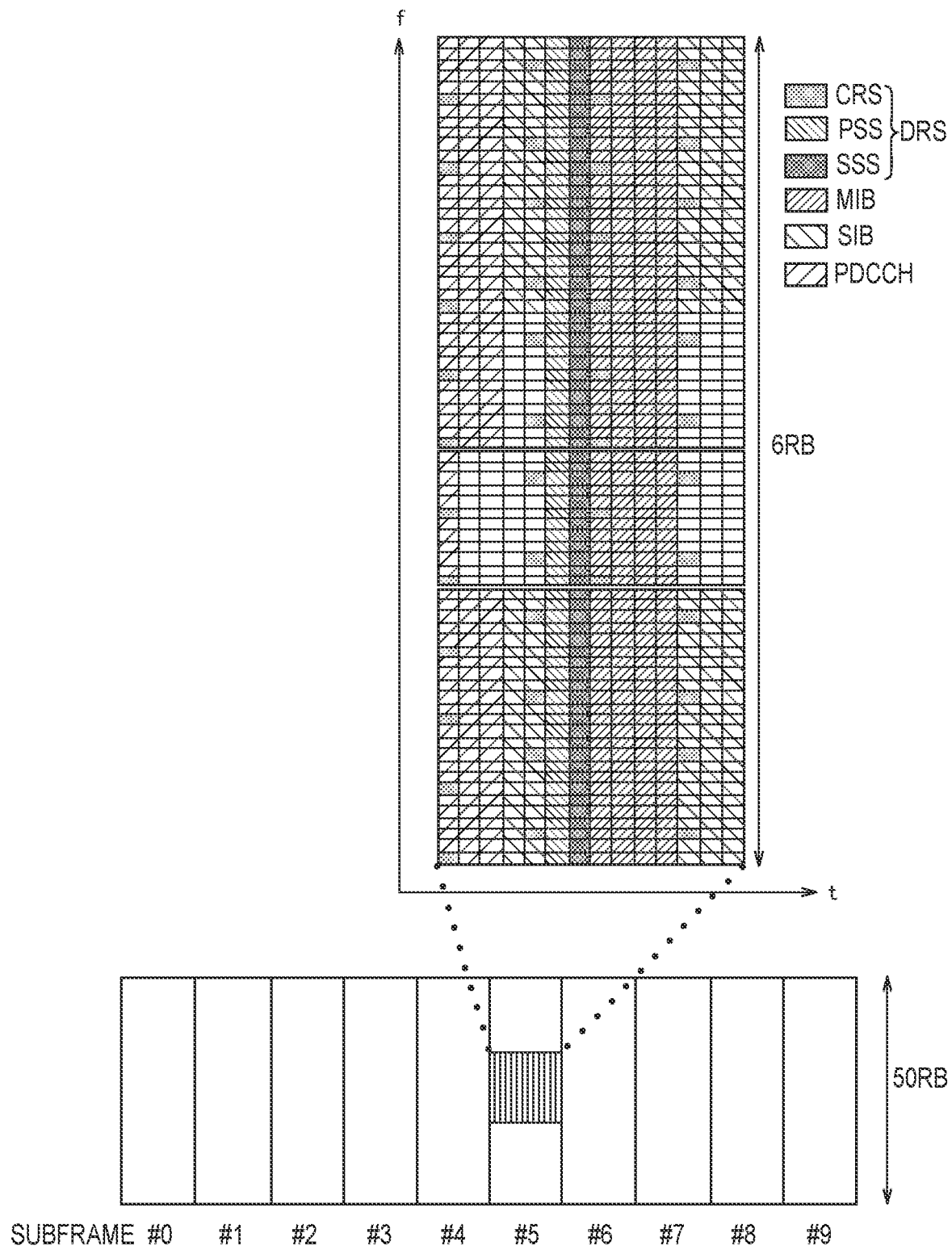
FIG. 12 is a diagram illustrating an example of a downlink physical channel configuration according to a second embodiment.

FIG. 12 is a diagram illustrating an example of a downlink physical channel configuration according to the second embodiment. In the example illustrated in FIG. 12, the DRS subframe is subframe number #5. The eNB 200 transmits the DRS and the broadcast signal in the center frequency portion (6 resource block) of the subframe of subframe number #5. The central frequency portion includes a control region in which the PDCCH is to be arranged (a section of the leading three symbols in the example of FIG. 12) and other regions. In the central frequency portion, CRSs are arranged in distributed resource elements. The region other than the control region includes a region in which the PSS is arranged and a region in which the SSS is arranged. In a region other than the control region, the MIB and the SIB are arranged in a region (empty region) in which the PSS and SSS are not arranged. Here, an example in which the broadcast signal is arranged only in the central frequency portion (6 resource block) of subframe number #5 is shown, but the broadcast signal may also be arranged in a portion other than the central frequency portion in subframe number #5.

In the second embodiment, the eNB 200 may transmit the MIB in the same transmission cycle as the transmission cycle of the DRS. The eNB 200 may explicitly or implicitly notify the UE 100 of the fact that the MIB is being transmitted in such a cycle by the DRS. In a typical LTE system, the transmission cycle of the MIB is 10 ms (equivalent to one radio frame), and the minimum transmission cycle of the DRS is 40 ms (corresponding to four radio frames).

In the second embodiment, the eNB 200 may transmit the MIB at 40 ms when transmitting the DRS in a cycle of 40 ms. That is, the eNB 200 may transmit the MIB in a cycle longer than the MIB transmission cycle in the licensed spectrum in the unlicensed spectrum. The general MIB includes only 8 bits of the SFN (10 bits) of the radio frame in which the MIB is transmitted. Since a repetition of four times is applied to the MIB, the UE 100 determines the remaining two bits by recognizing how many times the MIB is transmitted. If the DRS and the MIB are transmitted at a cycle of 40 ms, the repetition transmission may not be applied to the MIB. In the second embodiment, the MIB may include all of the SFN (10 bits) of the radio frame in which the MIB is transmitted. As a result, the UE 100 can grasp the actual SFN based only on the SFN included in the MIB.

Alternatively, the eNB 200 may transmit the DRS in the unlicensed spectrum at a shorter cycle than the DRS minimum transmission cycle in the licensed spectrum. As an example, the eNB 200 may transmit the DRS and the MIB at a cycle of 10 ms. In this case, the MIB may include only 8 bits out of the SFN (10 bits) of the radio frame in which the MIB is transmitted.

In the second embodiment, the eNB 200 may performs repetition transmission of the MIB in the frequency direction instead of repetition transmission of the MIB in the time domain. As an example, the eNB 200 may transmit a plurality of MIBs arranged discontinuously in the frequency domain in the same subframe. As a result, the frequency diversity effect can be obtained.

In the second embodiment, the eNB 200 may transmit the SIB at the same transmission cycle as the transmission cycle of the DRS. The SIB to be transmitted may be a general SIB, or may be a newly defined special SIB. The eNB 200 may transmit the special SIB instead of transmitting a plurality of other SIBs (e.g., SIB 1 to SIB 20). The special SIB includes at least part of the information to be conveyed by the plurality of other SIBs. That is, the special SIB may include necessary information extracted from information included in each of the plurality of other SIBs. As an example, the necessary information is a Clear Channel Assessment (CCA) threshold, a random access parameter, an uplink power control, and neighbor cell information. CCA is one process during LBT.

In the second embodiment, the eNB 200 may transmit a plurality of types of SIBs having different transmission cycles. The transmission cycle of each of the plurality of types of SIBs is an integer multiple of the transmission cycle of the DRS. Thus, even when the transmission cycle is different in each SIB, each SIB can be appropriately transmitted. As an example, the eNB 200 may transmit the SIB 1 at a cycle of 80 ms and transmit the SIB 2 at a cycle of 160 ms when transmitting the DRS at a cycle of 40 ms.

In the second embodiment, scheduling information indicating radio resources (resource blocks, resource elements) in which the SIBs are arranged may be notified by the PDCCH. Alternatively, radio resources (resource blocks, resource elements) in which the SIBs are arranged may be predefined according to the system specifications.

Third Embodiment

In the following, differences from the first and second embodiments will be mainly described with respect to the third embodiment.

In the unlicensed spectrum, the UE 100 may not be able to receive a desired signal over a long period of time since the transmission opportunity is limited in the eNB 200 depending on the outcome of the LBT.

In the third embodiment, the eNB 200 attempts to transmit a predetermined signal at a predetermined timing in the unlicensed spectrum. The UE 100 attempts to receive the predetermined signal at a predetermined timing in the unlicensed spectrum. The predetermined signal may be a paging signal, the predetermined timing may be a paging occasion. Alternatively, the predetermined signal may be a random access response, the predetermined timing may be a reception waiting time of the random access response. In the following, a case where the predetermined timing is a periodic timing is mainly assumed.

The eNB 200 attempts to transmit the predetermined signal at a changed timing by changing the predetermined timing in response to the transmission of the predetermined signal being disabled at the predetermined timing. Specifically, when LBT before the predetermined timing fails, the eNB 200 shifts the predetermined timing later and continues the LBT. Then, the eNB 200 transmits the predetermined signal at the shifted timing in response to success of LBT. In response to the UE 100 not receiving any radio signal from the eNB 200 at the predetermined timing, the UE 100 attempts to receive the predetermined signal at the changed timing. Specifically, when no radio signal (for example, DRS) is received from the eNB 200 at the predetermined timing, the UE 100 determines that the eNB 200 has failed to LBT, shifts the predetermined timing, and continues the attempt to receive the predetermined signal. As a result, the UE 100 is able to receive the predetermined signal at an earlier stage.

Figure 13:
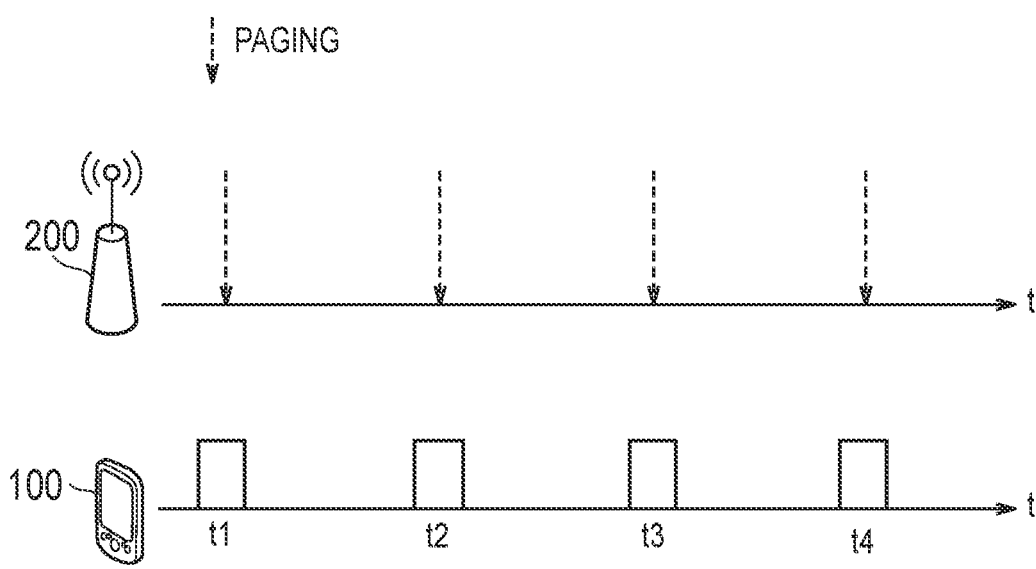
FIG. 13 is a diagram illustrating an example of an operation according to the second embodiment.
Figure 14:
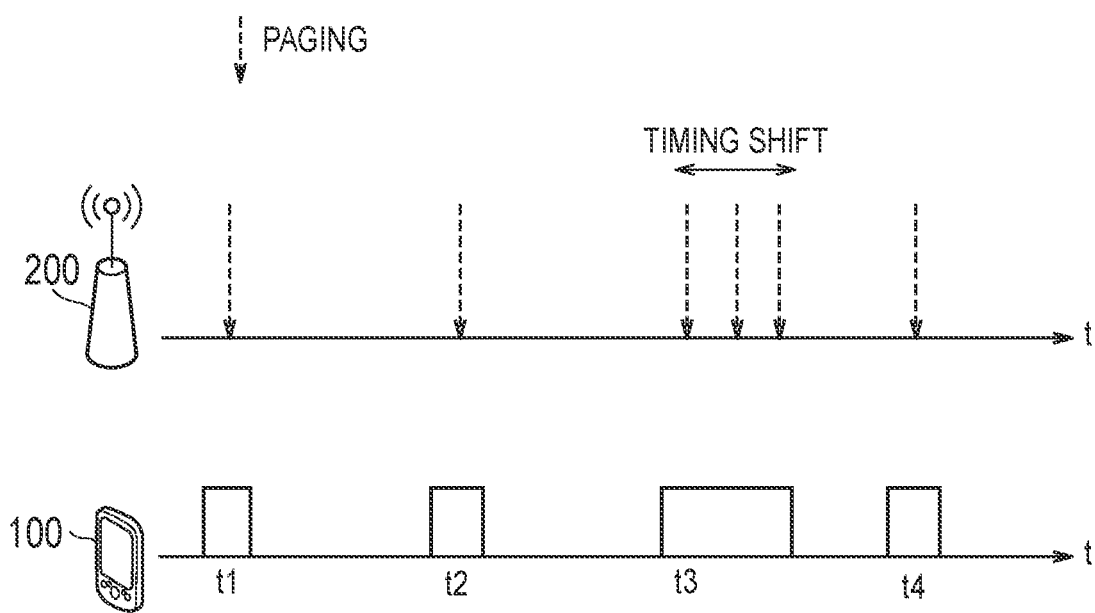
FIG. 14 is a diagram illustrating an example of an operation according to the second embodiment.

FIGS. 13 and 14 are diagrams illustrating an example of an operation according to the second embodiment. Here, an example in which a predetermined signal is a paging signal (Paging) and a predetermined timing is a paging occasion will be described. UE 100 may perform discontinuous reception (DRX: Discontinues Reception).

As shown in FIG. 13, when the eNB 200 receives the paging addressed to the UE 100 from the core network, the eNB 200 transmits the paging signal to the UE 100 in the paging occasion. The paging occasion occurs periodically in accordance with the DRX cycle configured in the UE 100. The UE 100 attempts to receive the paging signal for each subframe corresponding to the paging occasion. In the example shown in FIG. 13, the eNB 200 performs LBT before each paging occasion (t1 to t4) and attempts to transmit the paging signal. If the LBT fails continuously, the eNB 200 fails to transmit the paging signal at each paging occasion (t1 to t4). The UE 100 attempts to receive the paging signal at each paging occasion (t1 to t4), but fails to receive the paging signal. In this case, the UE 100 can not receive the paging signal for a long time.

As shown in FIG. 14, in the third embodiment, in response to transmission of the paging signal being disabled at the paging occasion, the eNB 200 attempts to transmit the paging signal at a timing after the shift by shifting the paging occasion. Specifically, when the LBT before the paging occasion (t3) fails, the eNB 200 shifts the paging occasion (t3) later, and continues the LBT. Then, in response to success of LBT, the eNB 200 transmits the paging signal at the shifted timing. The eNB 200 may shift the paging occasion only if the transmission of the paging signal fails continuously a certain number of times.

In response to the UE 100 not receiving any radio signal from the eNB 200 at the paging occasion (t3), the UE 100 attempts to receive the paging signal at the changed timing. Specifically, when the UE 100 does not receive any radio signal (for example, DRS or the like) from the eNB 200 at the paging occasion, the UE 100 determines that the eNB 200 has failed to LBT. The UE 100 shifts the paging occasion (t3) and continues to attempt to receive the paging signal. When the UE 100 continues the reception attempt for the paging occasion after the shift, the UE 100 may continuously continue the reception attempt, or may intermittently continue the reception attempt. Configuration information (for example, amount of timing shift) related to the paging occasion after the shift may be configured in advance from the eNB 200 to the UE 100 by broadcast signaling or dedicated signaling.

As described above, when no radio signal is received from the eNB 200 in the paging occasion, the UE 100 continues the reception attempt of the paging signal until the UE 100 receives a radio signal (including DRS or the like) from the eNB 200. The UE 100 may receive some radio signals from the eNB 200 while continuing the reception attempt of the paging signal, and stop the reception attempt if the radio signal is not a signal addressed to the UE 100. If the eNB 200 successfully LBT while the UE 100 continues to receive the paging signal, the UE 100 may receive a paging signal addressed to the UE 100 from the eNB 200.

Other Embodiments

The embodiments described above may be independently executed and may also be implemented by combining two or more embodiments. For example, part of operations according to one embodiment may be added to another embodiment. Alternatively, part of operations according to one embodiment may be replaced with part of operations of another embodiment. In the embodiments described above, an example in which the specific frequency band is the unlicensed spectrum has been described. However, the specific frequency band may be a licensed spectrum or the like in which LBT is required.

In the embodiments described above, a scenario in which the UE 100 communicates with one eNB 200 is assumed, but a scenario (so-called dual connectivity) in which the UE 100 performs simultaneous communication with two eNBs 200 may be assumed. The UE 100 may use the unlicensed spectrum for communication with at least one eNB 200 among the two eNBs 200.

In the embodiment described above, an LTE system is illustrated as a mobile communication system. However, the present invention is not limited to LTE systems. The present invention may be applied to a communication system other than the LTE system.

The entire contents of Japanese Patent Application No. 2016-199739 (filed Oct. 11, 2016) are incorporated herein by reference.

INDUSTRIAL APPLICABILITY

The present invention is useful in the mobile communication field.

The invention claimed is:

1. A mobile communication system comprising:
a base station configured to transmit a synchronization signal and a master information block in a shared spectrum, and
a user equipment configured to receive the synchronization signal and the master information block in the shared spectrum, wherein
the base station is configured to transmit the master information block at a same transmission cycle as a transmission cycle of the synchronization signal, the base station is configured to transmit to the user equipment via the shared spectrum, predetermined information indicating time domain positions at which the synchronization signal and the master information block are to be transmitted in the shared spectrum, wherein
the base station is configured to transmit the synchronization signal and the master information block in the shared spectrum after performing Listen-Before-Talk (LBT) and the LBT being successful,
the predetermined information indicates, as the time domain positions, a periodicity of a time period periodically arranged in the time domain, the time period comprising a plurality of continuous subframes in which the user equipment attempts to receive the synchronization signal and the master information block, and a number of a plurality of time units in the time period, where each time unit is shorter than a subframe, and
the periodicity indicated by the predetermined information is smaller than 40 ms.

2. The mobile communication system according to claim 1, wherein
the base station is configured to transmit the synchronization signal and the master information block in consecutive symbols.

3. A base station comprising:
a transmitter configured to transmit, to a user equipment, a synchronization signal and a master information block in a shared spectrum, wherein
the transmitter is configured to transmit, to the user equipment, the master information block at a same transmission cycle as a transmission cycle of the synchronization signal, and
the transmitter is configured to notify the user equipment, via the shared spectrum, of predetermined information indicating time domain positions at which the synchronization signal and the master information block are to be transmitted in the shared spectrum, wherein
the transmitter is configured to transmit the synchronization signal and the master information block in the shared spectrum after performing Listen-Before-Talk (LBT) and the LBT being successful,
the predetermined information indicates, as the time domain positions, a periodicity of a time period periodically arranged in the time domain, the time period comprising a plurality of continuous subframes in which the user equipment attempts to receive the synchronization signal and the master information block, and a number of a plurality of time units in the time period, where each time unit is shorter than a subframe, and
the periodicity indicated by the predetermined information is smaller than 40 ms.

4. A user equipment comprising:
a receiver configured to receive, from a base station, a synchronization signal and a master information block in a shared spectrum, wherein
the master information block is transmitted at a same transmission cycle as a transmission cycle of the synchronization signal, and
the receiver is configured to receive from the base station via the shared spectrum, predetermined information indicating time domain positions at which the synchronization signal and the master information block are to be transmitted in the shared spectrum, wherein
the synchronization signal and the master information block are transmitted in the shared spectrum after performing Listen-Before-Talk (LBT) and the LBT being successful,
the predetermined information indicates, as the time domain positions, a periodicity of a time period periodically arranged in the time domain, the time period comprising a plurality of continuous subframes in which the user equipment attempts to receive the synchronization signal and the master information block, and a number of a plurality of time units in the time period, where each time unit is shorter than a subframe, and
the periodicity indicated by the predetermined information is smaller than 40 ms.

5. A controller for controlling a user equipment, the controller comprising:
a processor configured to perform a process of receiving, from a base station, a synchronization signal and a master information block in a shared spectrum, wherein
the master information block is transmitted at a same transmission cycle as a transmission cycle of the synchronization signal, and
the processor is further configured to receive from the base station via the shared spectrum, predetermined information indicating time domain positions at which the synchronization signal and the master information block are to be transmitted in the shared spectrum, wherein the synchronization signal and the master information block are transmitted in the shared spectrum after performing Listen-Before-Talk (LBT) and the LBT being successful, the predetermined information indicates, as the time domain positions, a periodicity of a time period periodically arranged in the time domain, the time period comprising a plurality of continuous subframes in which the user equipment attempts to receive the synchronization signal and the master information block, and a number of a plurality of time units in the time period, where each time unit is shorter than a subframe, and the periodicity indicated by the predetermined information is smaller than 40 ms.

6. A method comprising:

transmitting, by a base station, a synchronization signal and a master information block in a shared spectrum, and receiving, by a user equipment, the synchronization signal and the master information block in the shared spectrum, wherein the transmitting includes transmitting the master information block at a same transmission cycle as a transmission cycle of the synchronization signal, and the method further comprises transmitting by the base station to the user equipment via the shared spectrum, predetermined information indicating time domain positions at which the synchronization signal and the master information block are to be transmitted in the shared spectrum, wherein the synchronization signal and the master information block are transmitted in the shared spectrum after performing Listen-Before-Talk (LBT) and the LBT being successful, the predetermined information indicates, as the time domain positions, a periodicity of a time period periodically arranged in the time domain, the time period comprising a plurality of continuous subframes in which the user equipment attempts to receive the synchronization signal and the master information block, and a number of a plurality of time units in the time period, where each time unit is shorter than a subframe, and the periodicity indicated by the predetermined information is smaller than 40 ms.

\* \* \* \* \*